United States Patent [19]
Norris

[11] Patent Number: 6,019,525
[45] Date of Patent: Feb. 1, 2000

[54] SELF-DEVELOPING FILM ASSEMBLAGE

[75] Inventor: Philip R. Norris, No. Reading, Mass.

[73] Assignee: Polaroid Corporation, Cambridge, Mass.

[21] Appl. No.: 09/237,409

[22] Filed: Jan. 26, 1999

Related U.S. Application Data

[60] Provisional application No. 60/073,055, Jan. 29, 1998.

[51] Int. Cl.[7] .................................................. G03D 9/02
[52] U.S. Cl. ........................................ 396/583; 430/207
[58] Field of Search ................................. 396/30, 32, 33, 396/527, 583, 31; 430/207, 208, 209, 498, 500; 206/497

[56] References Cited

U.S. PATENT DOCUMENTS

| | | | |
|---|---|---|---|
| 4,100,559 | 7/1978 | Wareham et al. | 396/30 |
| 5,240,111 | 8/1993 | Yamashita et al. | 206/497 |
| 5,870,633 | 2/1999 | Norris | 396/33 |
| 5,888,693 | 3/1999 | Meschter et al. | 396/583 |

*Primary Examiner*—D. Rutledge
*Attorney, Agent, or Firm*—Leslie Payne

[57] ABSTRACT

A photographic film assemblage comprising: a plurality of photographic elements connected in end-to-end fashion and a separable portion connected to and between adjacent pairs of the elements is disclosed wherein each of the separable portions has at least a weakened segment that separates when pulled and allows adjacent pairs of the elements to separate. At least one layer is connected to one of the elements so as to extend generally longitudinally along the film assemblage and be in overlying relationship to at least the weakened portion. The layer is constructed and sized to reduce friction on the film assemblage in operative relationship to the pressure applying members to thereby enhance separation of the separable portions and the elements.

9 Claims, 1 Drawing Sheet

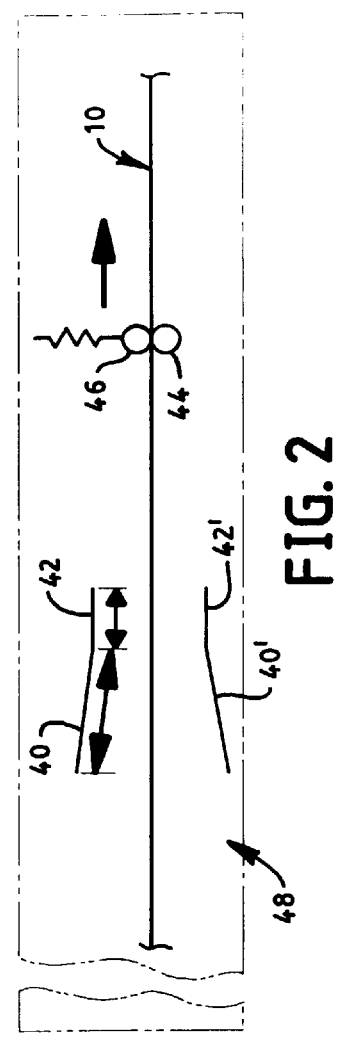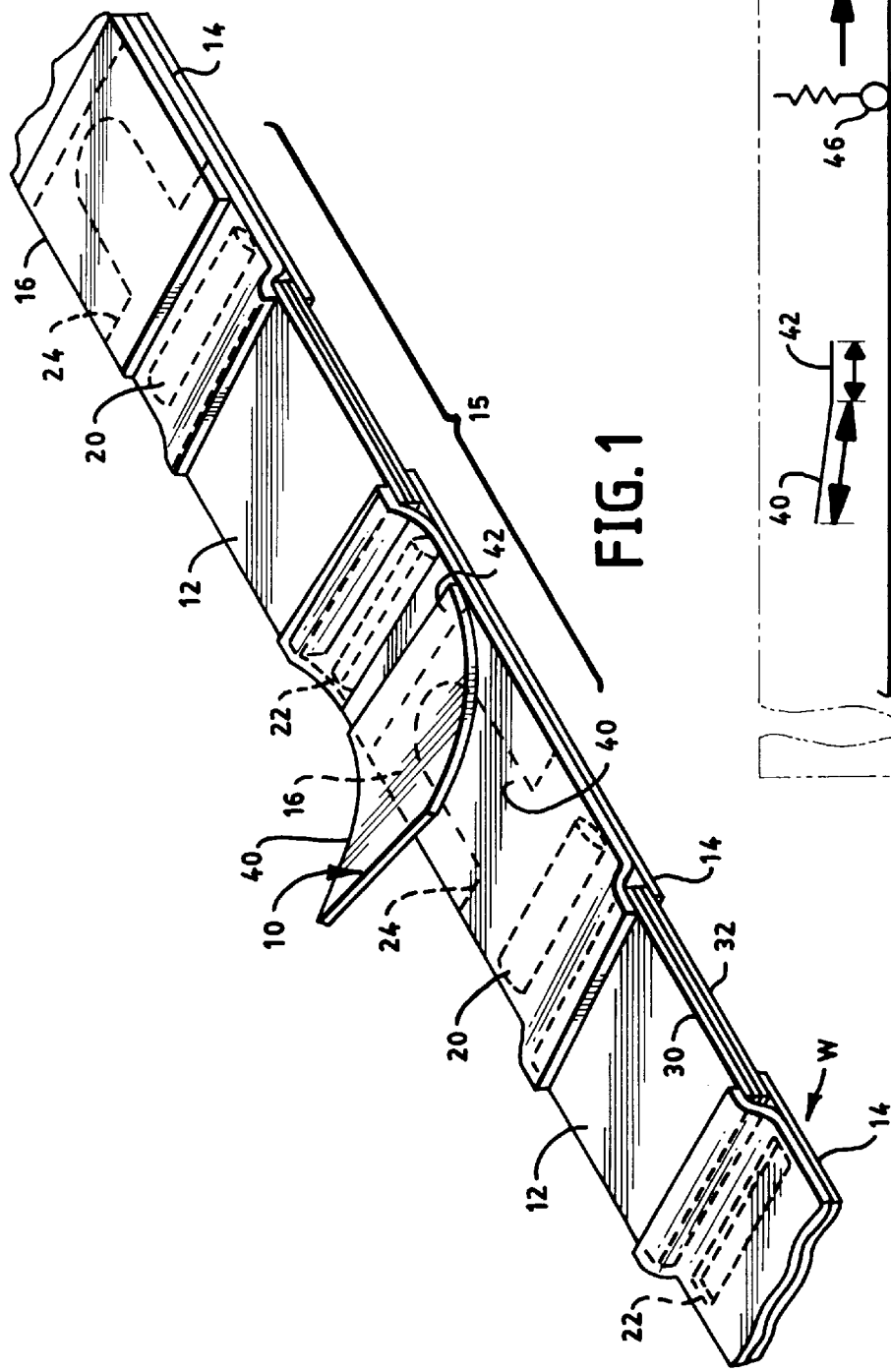

SELF-DEVELOPING FILM ASSEMBLAGE

This application claims benefit of Provisional Appln. 60/073,055 filed Jan. 29, 1998.

CROSS REFERENCE TO RELATED APPLICATIONS

The present application is related to copending U.S. patent application Ser. No. 08/808,040, filed Mar. 04, 1997 U.S. Pat. No. 5,870,633; as well as U.S. patent application Ser. Nos.: 08/958,902, U.S. Pat. No. 5,888,693 and 08/959,361; both filed Oct. 28, 1997.

BACKGROUND OF THE INVENTION

The present invention is directed to an improved self-developing film assemblage of the type described in the aforenoted copending U.S. patent applications, Ser. Nos.: 08/958,902, U.S. Pat. No. 5,888,693 and 08/959,361, which could be used in a photographic apparatus; such as described in the aforenoted copending U.S. patent application Ser. No. 08/808,040, U.S. Pat. No. 5,870,633. The film unit comprises an elongated strip containing a plurality of serially interconnected thin and flexible film units of the self-developing type, each of which is separable from the other by perforations therebetween separating in response to pulling of the film strip. When the film is loaded in the camera, a leading portion of a film unit protrudes from the camera housing and is pulled by the user in order to advance the film unit following an exposure cycle. The pulling advances the exposed film unit through processing rollers so that it exits the camera, whereby the next successive film unit is indexed into a position at the focal cone ready for exposure. The emerging processed film unit separates from the strip at the perforations in response to the pulling.

While such film assemblages, especially whenever used in a photographic apparatus of the foregoing type, are extremely beneficial, there are nevertheless desires to improve their overall reliability in terms of ensuring that the film units do not prematurely separate in the camera; especially when pulled.

SUMMARY OF THE INVENTION

According to the present invention, provision is made for an film assemblage of the self-developing type. In particular, provision is made for a film assemblage for use in a photographic device wherein the assemblage comprises a plurality of film units of the self-developing type which are serially interconnected to the other by separable portions. The portions are separable in response to pulling forces being exerted on a leading film unit and a next succeeding film unit in the assemblage encountering a preselected resistance to such pulling; whereby the separation occurs at or after the application point of the preselected resistance on the next succeeding film unit. Provision is made for means on each of the units for reducing frictional forces acting on a next succeeding film unit for avoiding separation of the separable portion prior to the application point of the preselected resistance. In one illustrated embodiment, the preselected resistance is provided by a pair of processing rollers acting on a processing pod of the next succeeding film unit.

In an illustrated embodiment, the means for reducing frictional forces includes a flap on each film unit and the separable portion includes perforations. The flap is sized and configured to cover the perforations to an extent so as to reduce the frictional forces in a manner which prevents premature separation prior to a unit encountering the application point of preselected resistance. In another illustrated embodiment, provision is made for having an additional flap on the opposite surface of the film assemblage. Further, each flap also assists in frictionally grabbing the next succeeding film unit in order to advance the same. Additionally, a pair of flaps serve to pinch the next succeeding film unit in order to advance the film assemblage. In this manner, there is provided a film assemblage which protects against premature separation of the separable portions prior to the point of application of the film units.

The above and other objects and scope of the present invention will become apparent following a reading of a detailed description thereof when taken in conjunction with the accompanying drawings in which like reference numerals indicate like structure throughout the several views.

BRIEF DESCRIPTION OF THE DRAWINGS

FIG. 1 relates to a perspective view of a fragment of a film assemblage made according to the principals of the present invention; and, FIG. 2 is an enlarged fragmented view of an improved film frame made consistent with the provisions of the present invention.

DETAILED DESCRIPTION

The present invention relates to an improvement of a film assemblage of the self-developing type which is described and illustrated in copending U.S. patent application Ser. Nos.: 08/958,902 U.S. Pat. No. 5,888,692 and 08/959,361; which descriptions are incorporated herein as a part hereof. Since the construction of the film assemblage does not, per se, form an aspect of the present invention, only those details which are necessary to understand the present invention are set forth below. Details of such a film assemblage construction are described in the noted copending patent applications.

Referring now to FIG. 1, there is shown a perspective view of a photographic film assemblage 10 of the invention comprising self-developing film units elements 12 secured end-to-end to connection strips 14 in alternating arrangement to form a longitudinal strip. The film assemblage 10 is conveniently subdivided into image units or frames 15 extending lengthwise from a structurally weakened frangible portion 24 on one connection strip 14 to the equivalent location on the adjacent connection strip 14. As will be discussed below, the weakened sections 24 preferably represent structurally weakened portions intended to permit easy separation of successive image units 15 as will be described.

Each film frame or image unit 15 comprises the film unit 12, a rupturable container 20 ("pod") with processing fluid adjacent the leading edge of the film unit 12 and containing processing liquid, a trap 22 adjacent the trailing edge of the film unit 12 adapted to receive excess processing liquid not consumed during processing of the film unit 12 in a cooperating exposure device, such as a camera (not shown). Both the rupturable container 20 and the trap 22 are attached to the connection strip 14 by, for example, adhesives. The functionality of rupturable containers and traps relating to self-developing film is well known in the art. The connecting strips and cover strips can be made of, for example, a polyester material having a thickness of 0.1 mm, preferably less, as is also known in the art.

Although the film unit 12 depicted in the FIG. 1 is of the integral type, wherein the image-receiving member 30 and the photosensitive member 32 are retained intact after photographic processing, the film unit 12 may also be of the peel-apart type, wherein the respective members are separated after processing. Such integral and peel-apart film units are well known in the art. A liquid-tight fluid passageway is provided between the rupturable container 20 and the leading edge of the film unit 12, and between the trailing edge of the film unit 12 and the trap 22. In one embodiment, a cover strip 16 generally coextensive in width with the connection strip 14 is disposed on top of the connection strip 14 and secured at its respective ends to the leading and trailing edges, respectively, of the film unit 12 by, for example, an adhesive.

With continued reference to FIG. 1, there is illustrated one preferred embodiment wherein the photographic film assemblage 10 is provided with at least a thin and flexible layer flap 40 hingedly connected at one end 42, as by heat sealing to a trailing portion of each one of the film image units 15. The flap 40 has a generally rectangular configuration and is constructed to overlay the film unit so as to extend (one of the flaps is depicted as upturned for purposes of illustrating better its construction) from the end 42 to about the pod of the next succeeding film image unit 15; thereby covering at least a significant segment of the weakened frangible portion 24.

The flap 40 can be made of thin masking material, as is the connecting strips. Other materials and configurations for the flap(s) are envisioned by the present invention consistent with carrying out the functions of the flap in reducing friction. Each flap 40 is also adapted to be engaged by the biased spread rollers 44, 46. The flap 40 serves to reduce the frictional forces exerted on a next succeeding film unit by the spread rollers 44, 46, in a direction opposite to pulling,. This reduces the likelihood of the next film unit experiencing a force which could lead to its leading (i.e., in the direction of pulling), weakened portion from separating prematurely before encountering the spread roller pair. That is separation of the units would occur prior to the spread rollers, as opposed to separating at or after the spread rollers. It will be understood that with the film assemblage of the present invention, that whenever the pod of one unit engages the spread roller pair a preselected separating resistance force will be applied to the unit carrying the engaging pod. This resistance is sufficient to assist causing the weakened portion 24 to separate from the leading film unit when the film assemblage is pulled. Since the flap 40 reduces the pulling friction, there is less of a tendency for the next succeeding film unit to wrinkle or separate when its pod engages the rollers and generates even more resistance to the spread rollers. The flap serves the additional function of assisting in grabbing the next succeeding film unit through the spread roller pair. In this latter regard, its interior facing surface can be provided with a relatively high friction surface.

The present invention also contemplates having an additional flap 40' (FIG. 2) on the opposite side of the film unit so as to also cover the weakened frangible portion 24. The additional flap 40' serves to further reduce the frictional forces acting on the film unit. In addition, both flaps 40 and 40' act to pinch the leading portion of the next succeeding film unit. It is preferred to have the flap on a portion of the film assembly so as not to overlay any indicia on the film.

As depicted in FIG. 2, the film assemblage 10 is adapted to be held in a camera 48, and pulled by a user in the direction of the arrows. Details of the camera 48 do not, per se, form an aspect of this invention, thus only the details thereof which are necessary to understand the present invention are set forth as described in copending U.S. patent application Ser. No. 08/808,040 U.S. Pat. No. 5,870,633. Following exposure of a film unit the just exposed film unit is advanced from the focal plane through the spread rollers system and out of the camera. The pulling simultaneously serially advances the next succeeding unexposed film unit from a storage pack therefor to a focal plane for subsequent exposure. The pulling of the leading end of the film stops when the pod of the unexposed unit engages the spread rollers and the application of this resistance effects separation between the leading and next film unit. The flaps, as noted, serve as indicated to prevent skewed pulling forces or additional frictional forces acting to cause a premature separation.

Other embodiments of the present invention are envisioned. For while the present illustrates a photographic film assemblage, it will be appreciated that the principles of the present invention can be applied to properly dispensing a strip containing a plurality of units which are interconnected by means of a frangible or otherwise weakened section, whereby the use of flaps can be used for reducing friction at the point of application of preselected resistance forces.

What is claimed is:

1. A photographic film assemblage comprising: a plurality of photographic elements connected in end-to-end fashion; a separable portion connects adjacent pairs of the elements, each of the separable portions has at least a weakened segment that separates when pulled and allows adjacent pairs of the elements to separate; and, at least one layer connected to one of the elements so as to extend generally longitudinally along the film assemblage and be in overlying relationship to at least a portion of the weakened segment, the layer being constructed and sized to reduce friction on the weakened segment in operative relationship to pressure applying members to thereby inhibit friction of pressure applying members from causing premature separation of the weakened segment.

2. The film assemblage of claim 1 further including a second layer connected to the one element on an opposing surface thereof and extending generally longitudinally in overlying relationship to at least a portion of the weakened segment; the second layer being constructed and sized to reduce friction on the film assemblage in operative relationship to the pressure applying members to thereby enhance separation of the separable portions and thereby the elements.

3. The film assemblage of claim 2 wherein the first and second layers are made of a thin flexible sheet material.

4. The film assemblage of claim 1 wherein each of the photographic elements includes a self-developing film unit.

5. The film assemblage of claim 4 wherein the separable portions are integrally connected to and between each pair of the adjacent elements.

6. A method of reducing premature separation of a photographic film assemblage passing in operative relationship to a pressure applying assembly, wherein the assemblage includes a plurality of photographic elements connected in end-to-end fashion and having a separable portion connected to and between adjacent pairs of the elements, wherein each of the separable portions has at least a weakened segment that separates when pulled and thereby allows adjacent pairs of the elements to separate; said method including the step of: reducing friction on the film assemblage passing in operative relationship to a pressure applying assembly by providing at least one layer connected to one of the elements of a pair of elements so as to extend generally longitudinally along the film assemblage and in overlying relationship to at least a portion of the weakened segment to thereby inhibit friction of a pressure applying assembly from causing premature separation of the weakened segment.

7. The method of claim 6 further including the step of providing the layer so that it is constructed and sized to reduce friction on the film assemblage in operative relationship to a pressure applying members.

8. The method of claim 6 further including the step of providing a second layer connected to the one element on an opposing surface thereof and extending generally longitudinally in overlying relationship to at least a portion of the weakened segment; wherein the second layer is constructed and sized to reduce friction on the film assemblage in operative relationship to the pressure applying members to thereby enhance separation of the separable portions and thereby the elements.

9. A method of separating ones of a plurality of film units of the self-developing type from a film assemblage thereof passing along a path in operative relationship to an application point of pressure, wherein the assemblage includes a separable portion connected to and between each adjacent pair of the end-to-end units, wherein each of the separable portions has at least a weakened segment that separates when encountering an application of resistance to the film assemblage when pulled in a direction generally along the path to thereby allow adjacent pairs of the units to separate; said method including the steps of: providing an application point of resistance to pulling the film assemblage in a preferred direction along the path to thereby cause separation of a leading unit from a succeeding film unit in the direction of pulling; providing a resistance on the film assemblage at a preselected point in the path of movement of the film assemblage so as to cause separation as the latter is pulled; reducing friction on the film assemblage passing in operative relationship to the resistance point by providing at least one layer connected to one of the units which extends generally longitudinally along the film assemblage and in overlying relationship to at least a portion of the weakened segment to thereby inhibit friction of the pressure application point from causing separation of the weakened segment prior to the application point; further including the step of: providing a second layer connected to the one unit on an opposing surface thereof and extending generally longitudinally in overlying relationship to at least a portion of the weakened segment; wherein the second layer is constructed and sized to reduce friction on the film assemblage in operative relationship to the application point of resistance to thereby inhibit premature separation of the separable portions at or after the application point.

* * * * *